United States Patent [19]

Ishimaru et al.

[11] Patent Number: 4,713,209

[45] Date of Patent: Dec. 15, 1987

[54] DRAIN RECOVERY SYSTEM FOR CONDENSATE FEEDWATER SYSTEM OF NUCLEAR POWER PLANT

[75] Inventors: Hitoshi Ishimaru, Hitachi; Toshiki Kobayashi, Katsuta, both of Japan

[73] Assignees: Hitachi, Ltd., Tokyo; Hitachi Engineering Co., Ltd., Ibaraki, both of Japan

[21] Appl. No.: 852,315

[22] Filed: Apr. 15, 1986

[30] Foreign Application Priority Data

Apr. 15, 1985 [JP] Japan .................................. 60-78369

[51] Int. Cl.⁴ .............................................. G21C 7/32
[52] U.S. Cl. .................................... 376/211; 376/258; 60/665
[58] Field of Search ............... 376/210, 211, 215, 241, 376/245, 258, 277; 60/665, 657, 646

[56] References Cited

U.S. PATENT DOCUMENTS

| | | | |
|---|---|---|---|
| 4,311,013 | 1/1982 | Kuribayashi | 60/657 |
| 4,319,320 | 3/1982 | Sato | 60/665 |
| 4,365,476 | 12/1982 | Masuda | 60/657 |
| 4,434,620 | 3/1984 | Ishimatu | 60/657 |
| 4,442,676 | 4/1984 | Rudolph | 60/657 |
| 4,576,007 | 3/1986 | Arakawa | 60/665 |
| 4,635,589 | 1/1987 | Draper | 376/245 |

FOREIGN PATENT DOCUMENTS 3330012 3/1985 Fed. Rep. of Germany .
379007 8/1964 Switzerland .
889962 2/1962 United Kingdom .
926615 5/1963 United Kingdom .

OTHER PUBLICATIONS

"Technical Report of Mitsubishi Heavy Industries", vol. 17, No. 2, (1980–1983).

Primary Examiner—Donald P. Walsh
Attorney, Agent, or Firm—Antonelli, Terry & Wands

[57] ABSTRACT

A drain recovery system for the condensate feedwater system of a nuclear power plant having condensate pumps for boosting the condensate from a condenser, and feedwater heaters for heating the condensate from the condensate pumps. The drain recovery system is provided with drain pumping-up recovery having a drain tank for storing a feedwater heater drain, and drain pumps connected to the drain tank for pumping up the drain therein to inject it into said condensate feedwater system at a predetermined portion thereof, and drain level control device having a conduit connected between a portion of the drain pumping-up recovery system upstream of the drain pumps and a portion of the condensate feedwater system upstream of the condensate pumps for causing the drain in the drain tank to be returned to the portion upstream of the condensate pumps by a pressure differential therebetween so as to maintain a drain level in the drain tank at a predetermined position when the plant operates at a low load level or the drain pumps malfunction.

10 Claims, 6 Drawing Figures

DRAIN RECOVERY SYSTEM FOR CONDENSATE FEEDWATER SYSTEM OF NUCLEAR POWER PLANT

BACKGROUND OF THE INVENTION

The present invention relates to a drain recovery system for the condensate feedwater system of a nuclear power plant and, more particularly, to a drain recovery system in which drains from feedwater heaters of the condensate feedwater system is collected and recovered to the condensate feedwater system.

Hitherto, a drain recovery system for the condensate feedwater system of a nuclear power plant has been known in which the feedwater heater drains stored in a drain tank are pumped-up by drain pumps to be injected into the condensate feedwater system at a predetermined portion thereof for recovery of the drains. For instance, "Technical Report of Mitsubishi Heavy Industries", page 16, vol. 17 (published March, 1980) discloses such a system adapted to recover a high-pressure feedwater heater drain in a pressurized water reactor (PWR) plant. On the other hand, boiling water reactor (BWR) plants operating in the U.S.A., such as BRUNSWICK Nos. 1 and 2 and Grand Gulf No. 1 each incorporate therein also such a systems adapted to recover a high-pressure feedwater drain.

In these known drain pumping-up recovery systems, the pressure of the portion of the condensate feedwater system at which the feedwater heater drain is injected thereinto varies significantly depending on the level of the load of the plant. More specifically, when the plant load is comparatively in a low level, the flow rate of the feedwater is correspondingly small, which in turn reduces the pressure drop in the condensate feedwater system and also serves to increase the delivery head of the condensate pumps, so that the pressure in the portion of the condensate feedwater system at which the collected drain is injected thereinto is increased. This means that the required delivery head of the drain pumps is largely changed depending on the level of the load. Namely, delivery head required for the drain pumps is large at the low load level and small at the high load level, so that the drain pumps must satisfy a wide range of the required delivery head. This in turn requires drain pumps of a large capacity, and complicates the specification and design of the drain pumps.

On the other hand, in case of the BWR plant, it is necessary to maintain the purity of the water in the condensate feedwater system at a degree as high as possible. This requires that the drain pumping-up recovery system incorporates a water purifier through which the drain is purified before it is injected into the condensate feedwater system. Unfortunately, however, the provision of the water purifier increases the pressure drop, which necessitates a further increase in the drain pump capacity and further complication of the design of the drain pumps. It might be desired that not only the high-pressure feedwater heater drain but also the low-pressure feedwater heater drain, are pumped-up and injected into the condensate feedwater system. In such a case, however, the flow rate of the drain treated by the drain pumps is increased and, in addition, the use of the water purifier becomes essential. This further increases the drain pump capacity so that the design of the pump is extremely complicated. For these reasons, the conventional system is not provided with a water purifier and is not designed for recovery of the low-pressure feedwater heater drain.

The known drain pumping-up recovery system encounters a problem that, when the drain pumps malfunction and trip, the flow rate of the drain injected into the condensate feedwater system and, hence, the flow rate of the feedwater supplied to the nuclear reactor becomes insufficient, and thus the plant might be scramed as a whole. In addition, the drain level in the drain tank is raised so that the flow of the drain from the high-pressure feedwater heater into the drain tank is impeded to cause a risk of a rise in the drain level in the high-pressure feedwater heater, which in turn may cause a reverse flow of the drains into the high-pressure turbine, with a result that the turbine is damaged. In order to obviate this problem, it has been necessary to install a spare drain pump and to start this spare drain pump in the event of a trip of one of the drain pumps. This also complicates the design of the drain pumps.

SUMMARY OF THE INVENTION

Accordingly, an object of the invention is to provide a drain recovery system for the condensate feedwater system of a nuclear power plant in which the drain pumps of the drain pumping-up recovery system for pumping-up and injecting the feedwater heater drain into the condensate feedwater system at a predetermined portion thereof can be of a small capacity, and the necessity of a spare drain pump is eliminated, thus simplifying and facilitating the design of the drain pump system.

To this end, according to the invention, there is provided a drain recovery system for the condensate feedwater system of a nuclear power plant, said condensate feedwater system including condensate pumps for boosting the condensate from a condenser, and feedwater heaters for heating the condensate from said condensate pumps, said drain recovery system comprising: drain pumping-up recovery means including a drain tank for storing a feedwater heater drain, and drain pump means connected to said drain tank for pumping-up the drain therein to inject the drain into said condensate feedwater system at a predetermined portion thereof; and drain level control means including conduit means connected between a portion of said drain pumping-up recovery means upstream of said drain pump means and a portion of said condensate feedwater system upstream of said condensate pumps for causing the drain in said drain tank to be returned to said portion upstream of said condensate pumps by a pressure differential therebetween so as to maintain drain level in said drain tank at a predetermined position when the plant operates at a low load level or said drain pump means malfunctions.

DESCRIPTION OF THE PREFERRED EMBODIMENTS

Preferred embodiments of the invention will be described hereinunder with reference to the accompanying drawings.

Figure 1:
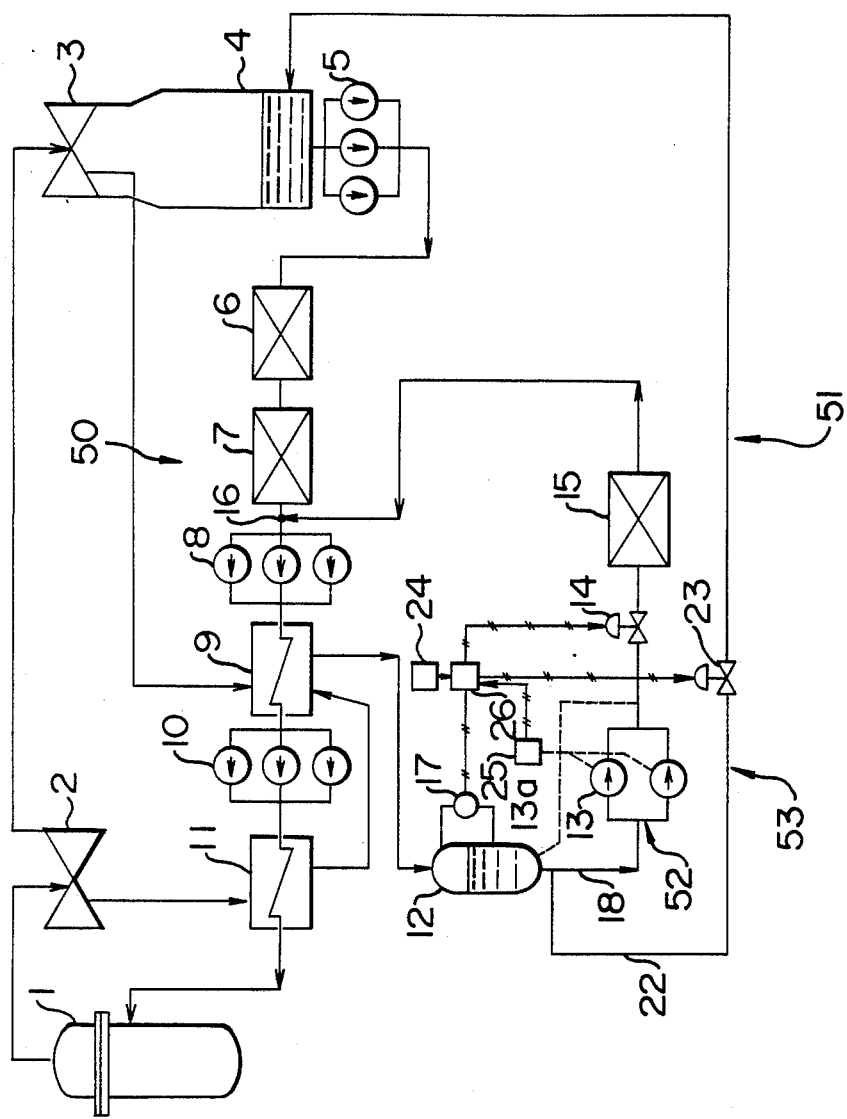
FIG. 1 is a schematic view showing a first preferred embodiment of the drain recovery system in accoreance with the invention.

Referring first to FIG. 1, the steam generated in a nuclear reactor 1 is introduced into a high-pressure turbine 2 and then into a low-presusre turbine 3 so as to drive the turbines. The steam which has been used in the low-pressure turbine is cascaded down in a condenser 4 to become a condensate, and the condensate is fed back as a feedwater to the nuclear reactor 1 through a condensate feedwater system 50. More specifically, the condensate in the condenser 4 is sucked into and boosted by low-pressure condensate pumps 5 and is purified through a condensate filter 6 and a condensate desalination device 7 to a degree sufficient for the condensate to be able to be fed into the nuclear reactor. The condensate thus purified is sucked into and boosted by high-pressure condensate pumps 8 and is delivered to a low-pressure feedwater heater 9 in which the condensate is heated by the steam extracted from the low-pressure turbine 3. The heated condensate is sucked into and boosted by feedwater pumps 10 and is delivered to a high-pressure feedwater heater 11 in which the condensate is further heated by the steam extracted from the high-pressure turbine 2 before supplied to the nucelar reactor 1 as the feedwater.

The extracted steam which has heated the condensate in the high-pressure feedwater heater 11 is condensed into a drain as a result of the heat exchange with the condensate. The drain is introduced into to the low-pressure feedwater heater 9 by the pressure differential therebetween so as to heat the condensate in the low-pressure feedwater heater 9. The extracted stream which has heated the condensate in the low-pressure feedwater heater 9 is also condensed into a drain, which is sent to a drain recovery system 51 together with the drain from the high-pressure feedwater heater which has heated the condensate in the low-pressure feedwater heater 9.

The drain recovery system 51 has a drain pumping-up recovery system 52 including a drain tank 12 for storing the feedwater heater drains, and a drain level control device 53 for maintaining the drain level in the drain tank 12 at a predetermined position.

The drain tank 12 of the drain pumping-up recovery system 52 is connected to the low-pressure feedwater heater 9 so that the drain in the low-pressure feedwater heater 9 can be introduced into the drain tank 12 by the pressure differential therebetween. The drain recovery system 51 also has drain pumps 13 which suck up the drains in the drain tank 12 and delivers the same to a drain purifier 15 through a control valve 14. The purified drain from the drain purifier 15 is injected, by the operation of the drain pumps 13, into the condensate feedwater system 50 at a predetermined portion 16 thereof positioned on the inlet side of the high-pressure feedwater pump 8. A minimum flow pipe 13a is connected between the outlet side of the drain pump 13 and the drain tank 12. When the control valve 14 is closed, the drain discharged from the drain pumps 13 is returned to the drain tank 12 through the minimum flow pipe 13a, thereby securing the minimum flow rate necessary for the continuous operation of the drain pumps 13. The drain level in the drain tank 12 is detected by a drain level detector 17 and is maintained constant by the operation of the control valve 14. With this arrangement, the flow rate of the drains injected into the condensate feedwater system at the portion 16 thereof is equalized to the flow rate of the drains introduced into the drain tank 12, so that the required flow rate of the feedwater supplied to the nuclear reactor is ensured at the portion 16. The flow rate of the feedwater supplied to the nuclear reactor 1 is controlled by means of a speed controller (not shown) for the turbine which drives the feedwater pumps 10, and also by a flow-rate control valve (not shown) provided on the outlet side of the feedwater pumps 10 as the level of the water in the nuclear reactor 1 is detected by a water level detector (not shown).

In the embodiment shown in FIG. 1, the drain level control device 53 has a conduit 22 through which a drain outlet pipe 18 is connected to the condenser 4. The conduit 22 is provided with a second control valve 23. The drain level control device 53 further has a load level detector 24 which detects the level of the load of the plant, a trip detector 25 for detecting a trip of any one of the drain pumps 13, and a change-over device 26 responsive to the output signals from the load level detector 24 and the trip detector 25 for selectively transferring the output signal from the drain level detector 17 to either one of the first control valve 14 and the second control valve 23.

The drain level detector 17 is adapted to generate a drain level signal when the drain level in the drain tank 12 should exceed a predetermined position. The load level detector 24 detects the load level of the plant by detecting the flow rate of the feedwater supplied to the nuclear reactor 1 or by detecting the load imposed on an electric generator not shown for example. When the load level of the plant is low, the load level detector 24 produces a low load signal. The trip detector 25 detects a trip of any one of the drain pumps 13 by sensing the delivery pressure of each drain pump 13, and produces a trip signal upon detection of the trip.

Figure 2:
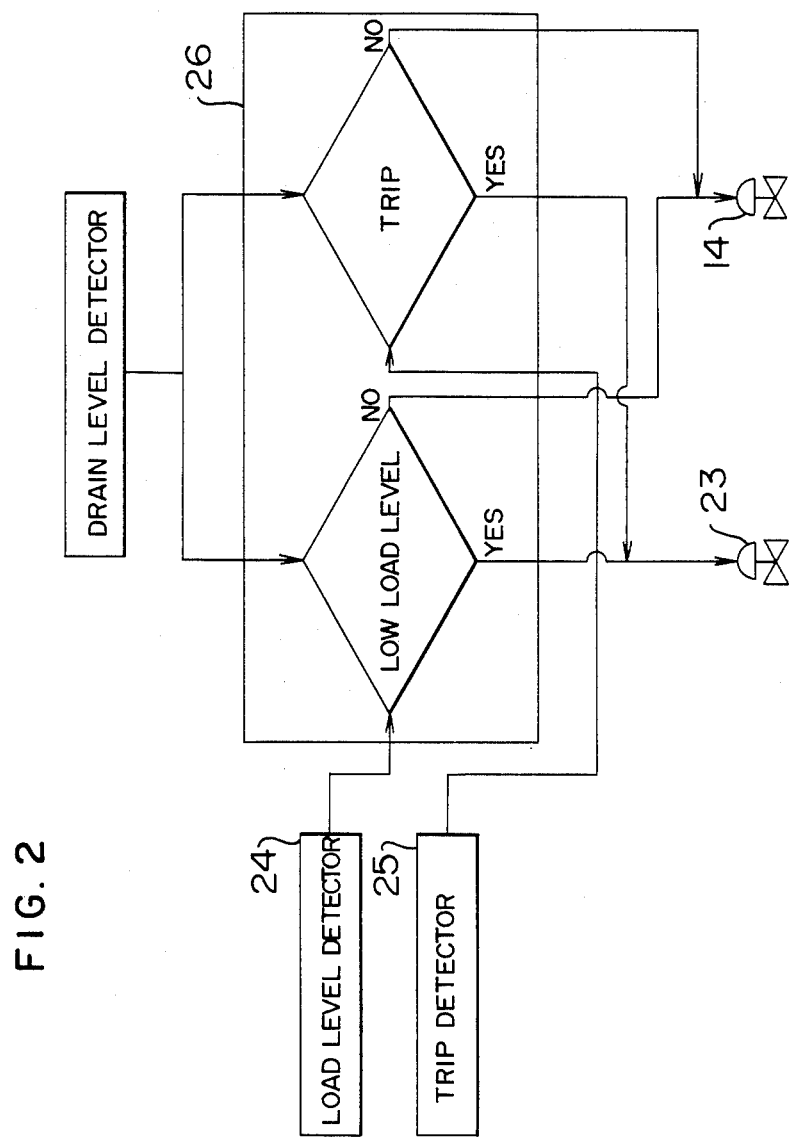
FIG. 2 is a view showing a function of the change-over device in the system shown in FIG. 1.

As will be seen from FIG. 2, the change-over device 26 transfers the drain level signal from the drain level detector 17 to the first control valve 14 when neither the low load signal nor the trip signal is outputted from the load level detector 24 and the trip detector 25, and it transfers the drain level signal to the second control valve 23 when at least one of the low level signal and the trip signal is outputted.

The operation of the drain recovery system 51 will be explained hereinunder.

During normal operation of the plant, i.e., when the level of the load of the plant is not in the low-load range of 50% or lower and no trip of the drain pumps 13 occurs, the drain level detector 17 produces a drain level signal when the drain level in the drain tank 12 should exceed the predetermined position. In this case, since neither the low load signal nor the trip signal is produced by the load level detector 24 and the trip detector 25, the change-over device 26 transfers the drain level signal to the first control valve 14, thereby opening the same. Consequently, the drains in the drain tank 12 pumped up by the drain pumps 13 are delivered to the drain purifier 15 through the control valve 14 and are injected into the condensate feedwater system 50 at the portion 16 thereof for recovery therein. When the drain level in the drain tank has come down below the predetermined positions, the drain level detector 17 stops the delivery of the drain level signal so that the control valve 14 is closed. In this case, the drain pumps 13 continue to operate so that the drains delivered by the drain pumps are recirculated to the drain tank 12 through the minimum flow pipe 13a. Thus, the drain level in the drain tank 12 is maintained at the predetermined position, while the required flow rate of the feedwater supplied to the nuclear reactor 1 is secured. The drain pumps 13 may be designed such that they are automatically started and stopped in accoreance with the operation of the control valve 14.

When the load level of the plant is low, e.g., below 50%, as in the time of start-up of the plant, the load detector 24 produces the low load signal, so that the change-over device 26 operates to transfer the drain level signal to the second control valve 23 in response to the low load signal from the load level detector 24. Therefore, when the drain level in the drain tank 12 should exceed the predetermined position, the drain level detector 17 produces the drain level signal which is transferred to the second control valve 23 through the change-over device 26, so that the second control valve 23 is opened. As a result, since a high vacuum has been established in the condenser 4, the drains in the drain tank 12 are sucked into the condenser 4 through the conduit 22 by the pressure differential. At this time, the first control valve 14 is closed since the drain level signal is not transferred thereto, so that the drain pump 13 operates to recirculate the drains through the minimum flow pipe 13a as explained below.

When the load level of the plant is low, the flow rate of the feedwater supplied to the nuclear reactor 1 is small, so that the low-pressure condensate pumps 5 can afford to feed the required flow rate of feedwater to the nuclear reactor 1.

The drain pumps 13 are required to have a delivery head which equals to the sum of the pressure in the portion 16 of the condensate feedwater system 50 at which the drains are injected thereinto and the pressure drop at the delivery side of the drain pumps 13. According to the invention, it is possible to reduce the required delivery head of the drain pumps 13 by virtue of the operation of the drain level control device 53, as will be understood from the following description.

Figure 3:
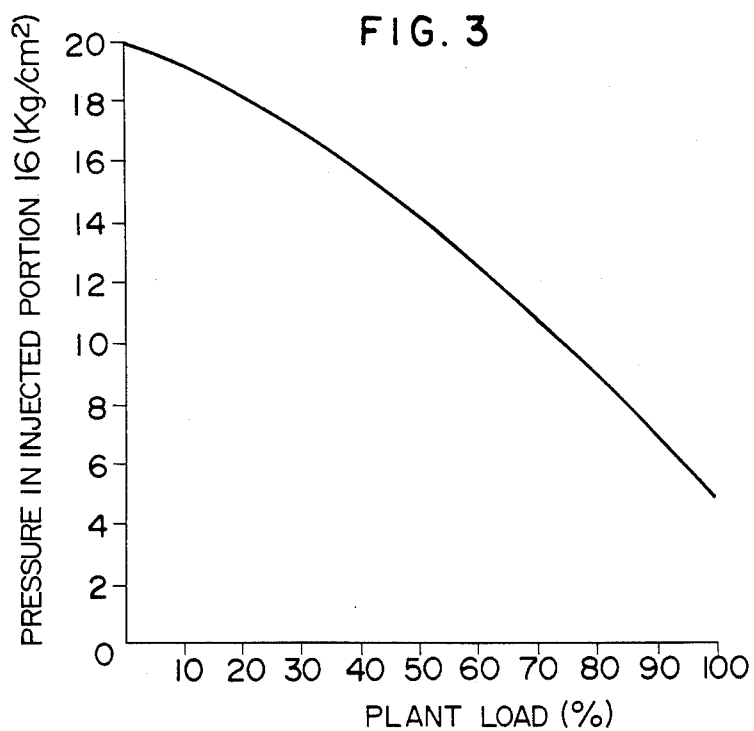
FIG. 3 is a diagram showing the relationship between the load level of the plant and the pressure in the portion of the condensate feedwater system at which the drains are injected thereinto.

FIG. 3 shows the change in the pressure in the portion 16 of the condensate feedwater system at which the drains are injected thereinto. It will be seen that the pressure at the portion 16 is comparatively high when the load level of the plant is low. This is attributable to the facts that at the low load level of the plant, the pressure drop along the condensate feedwater system 50 is small due to the small flow rate of feedwater and also the delivery head of the condensate pump 5 is high due to the small flow rate of feedwater.

Figure 4:
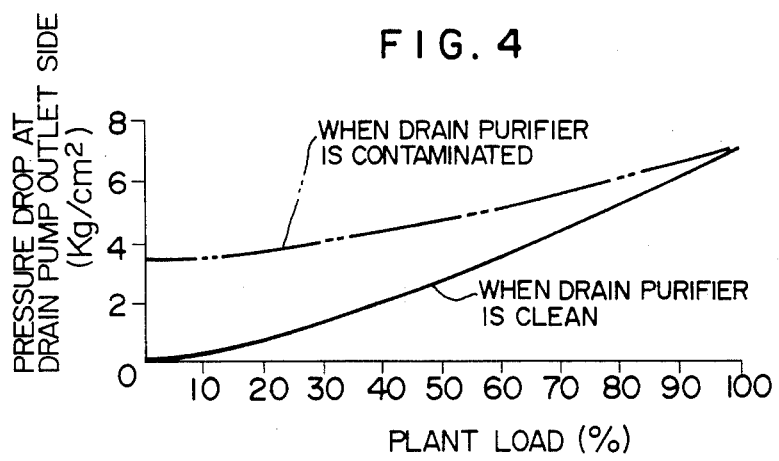
FIG. 4 is a diagram showing the relationship between the load level of the plant and the pressure drop at the outlet side of the drain pumps.

FIG. 4 shows the pressure drop at the delivery side of the drain pumps 13. It will be seen that the pressure drop is increased as the load level of the plant is increased. This is attributable to the fact that the amount of the drains from the feedwater heaters is increased with the increase in the load level of the plant. It will also be noted that the drain purifier 15 is contaminated day by day, and as the contamination of the drain purifier 15 becomes heavy, the pressure drop becomes serious even during low-load operation of the nuclear reactor in which the amount of drains is comparatively small.

Figure 5:
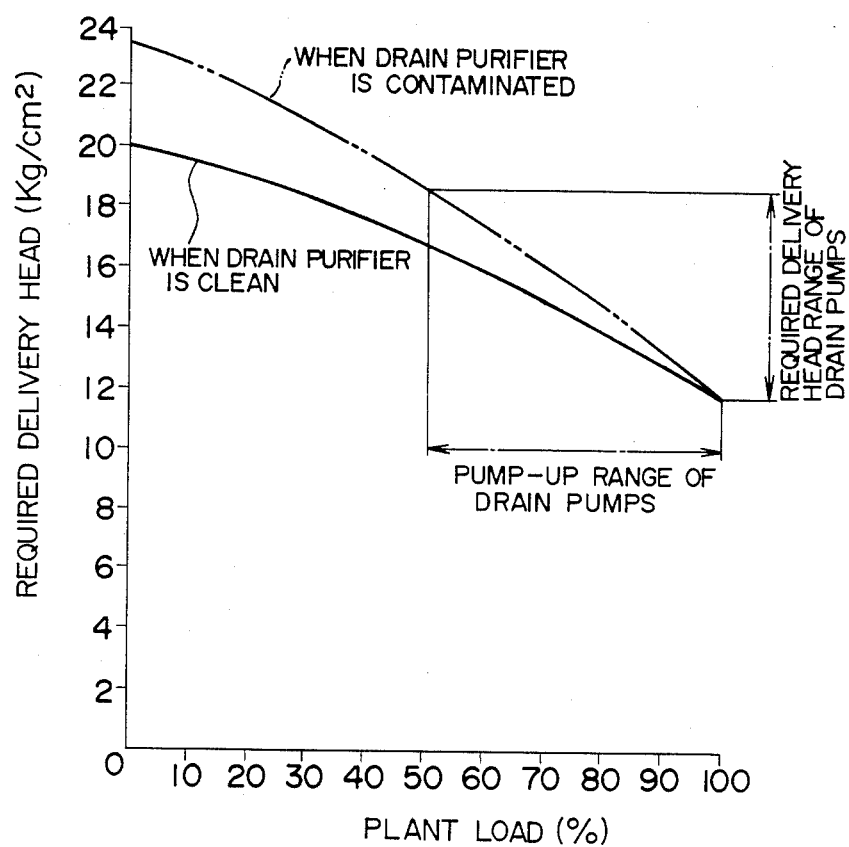
FIG. 5 is a diagram showing the relationship between the load level of the plant and the required delivery head, i.e., the sum of the pressure shown in FIG. 3 and that shown in FIG. 4.

FIG. 5 shows the sum of the pressure shown in FIG. 3 in the portion 16 of the condensate feedwater system 50 at which the drains are injected thereinto and the pressure drop shown in FIG. 4 experienced at the outlet side of the drain pumps 13. It will be seen that the delivery head required for injecting the drains at the portion 16 is increased as the load level becomes lower. It is assumed here that the drain level control device 53 is not provided so that the drain pumps 13 must deliver the drains to the portion 16 of the condensate feedwater system 50 over the entire range of load levels of the plant. In such a case, a large difference in the required delivery head is observed since the required delivery head at the low load level of the plant is high while the required delivery head at the high load level of the plant is low. Thus, the drain pumps must satisfy a wide range of the required delivery head. This complicates the specification of the drain pumps and makes it difficult to design the drain pump system.

According to the invention, when the load level of plant is low, e.g., 50% or below, the drain level control device 53 opens the second control valve 23 so as to maintain the drain level in the drain tank 12 constant. Therefore, when the plant operates with a low load level such as 50% or below, it is not necessary to pump-up and deliver the drains to the condensate feedwater system 50 by the drain pumps 13. It is, therefore, possible to reduce the delivery head required for the drain pumps 13 and, hence, to reduce the capacity of the drain pumps 13, which makes it possible to use smaller pumps as the drain pumps, while simplifying the design of the drain pumps system. In addition, the required flow rate of the feedwater supplied to the nuclear reactor 1 is maintained so that any risk of scram of the plant is avoided, as well as any risk of damage of the steam turbine which may otherwise occure as a result of rise of the drain level in the drain tank 12.

When the drain pumps 13 malfunction and trip and the drain level in the drain tank 12 should exceed the predetermined position, the trip detector 25 detects the trip and produces the trip signal while the drain level detector 17 detects the drain level and produces the drain level signal. Thus, in response to the trip signal, the change-over device 26 transfers the drain level signal to the second control valve 23 thereby to open the same. Consequently, the drain in the drain tank 12 is sucked into the condenser 4 from the drain tank 12 by the pressure differential therebetween, so that the drain level in the drain tank 12 is maintained constant.

As a result, the flow rate of the feedwater supplied to the nuclear reactor 1 is maintained so as to avoid any risk of scram of the nuclear reactor 1, as well as any risk of damage of the low-pressure turbine 3 which may otherwise occur as a result of rise of the drain level in the drain tank 12. This in turn eliminates the necessity for the preparation of a spare drain pump, thus allowing a rationalization of the drain recovery system as a whole.

A second embodiment of the invention will be described hereinunder with reference to FIG. 6.

Figure 6:
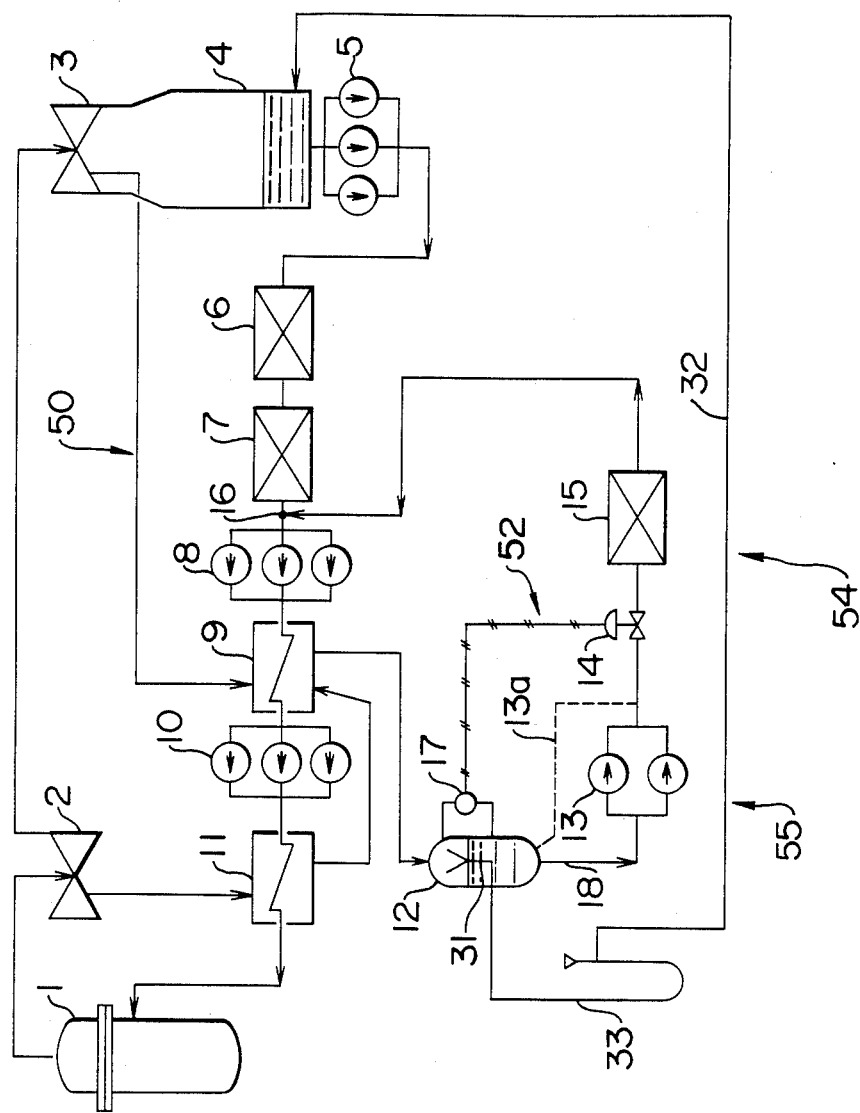
FIG. 6 is a schematic view showing a second preferred embodiment of the invention.

In FIG. 6, the same reference numerals are used to denote the same or similar parts or members as those used in the embodiment shown in FIG. 1. The embodiment of the drain recovery system generally designated by a numeral 54 has a drain level control device 55 including a conduit 32 connected between an overflow pipe 31 disposed in the drain tank 12 and the condenser 4. This conduit 32 has no control valve but is provided with a loop seal 33 for maintaining a predetermined pressure differential between the drain tank 12 and the condenser 4. The overflow pipe 31 is positioned at a predetermined height within the drain tank 12.

In this embodiment, the drain level detector 17 of the drain pumping-up recovery system 52 is directly connected to the control valve 14.

During the normal operation in which the load level is not low, e.g., 50% or below and no trip of the drain pump 13 occurs, the drain level detector 17 produces a drain level signal when the drain level the drain tank 12 should exceed the predetermined position. In response to the drain level signal, the control valve 14 opens so that the drain in the drain tank 12 is pumped up and injected into the condensate feedwater system 50 at the portion 16 thereof by the operation of the drain pumps 13. It is thus possible to maintain the required flow rate of the feedwater in the condensate feedwater system 50, while maintaining a constant drain level in the drain tank 12. During this operation, since a predetermined pressure differential is maintained between the drain tank 12 and the condenser 4 by virtue of the loop seal 33, the undesirable flush of hot drains in the drain tank 12 which may otherwise occur by introduction of the vacuum from the condensider into the drain tank is prevented. This is turn avoids any reduction of temperature in the drain tank 12 attributable to the transfer of vapor and heat from the drain tank 12 into the condenser 4.

During operation of the plant at a comparatively low load level, when the drain level in the drain tank should exceed the predetermined position, the drain level signal produced by the drain level detector 17 also opens the control valve 14. In this case, however, the drains cannot be injected into the condensate feedwater system 50 at the portion 16 thereof, but is merely recirculated through the minimum flow pipe 13a. This is because the capacity of the drain pumps 13 is made so small as to just enough to provide the delivery head required when the load level of the plant is over 50%. Consequently, the level of the drains in the drain tank 12 is further raised. However, when the drain level reaches an upper end of the overflow pipe 31, the drains flow into the drain conduit 32 and is sucked into the condenser 4 by the pressure differential between the drain tank 12 and the condenser 4. It is thus possible to maintain a constant drain level in the drain tank 12 by virtue of the overflow pipe 31. Thus, the embodiment shown in FIG. 6 offers the same advantage as that produced by the first embodiment, owing to the fact that the drains introduced into the drain tank 12 is recovered in the condenser 4 through the overflow pipe 31 and the conduit 32.

In addition, in the event of a rise of the drain level in the drain tank 12 due to insufficient pump-up capacity caused by a trip of any one of the drain pumps 13, the drains are safely sucked into the condenser 4 also through the overflow pipe 31 and the conduit 32, so that various troubles and accidents which may otherwise be cause by the rise of the drain level are avoided as in the case of the embodiment shown in FIG. 1.

Besides the advantages brought about by the embodiment shown in FIG. 1, the embodiment shown in FIG. 6 offers another advantage in that it eliminates the control element which are required in the first embodiments for controlling the operations of the two control valves, thus contributing to a simplification of the control system.

As apparent from the foregoing, in the present invention, the drain level in the drain tank can be maintained constant while the required flow rate of the feedwater supplied to the nuclear reactor 1 is secured, even if the drain pumps are not able to pump up and inject the drains to the condensate feedwater system during plant operation at a comparatively low load level, and therefore the size and capacity of the drain pumps can be reduced and the design of the drain pump system can be simplified.

In addition, since the constant drain level in the drain tank 12 and the required flow rate of the feedwater to the nuclear reactor are ensured even in the case of trip of the drain pumps, any risk of scram of the plant as well as damage of the turbine can be avoided and thus the necessity for the provision of a spare drain pump can be avoided advantageously.

What is claimed is:

1. A drain recovery system for the condensate feedwater system of a nuclear power plant, said condensate feedwater system including condensate pumps for boosting the condensate from a condenser, and feedwater heaters for heating the condensate from said condensate pumps, said drain recovery system comprising:

drain pumping-up recovery means including a drain tank for storing a feedwater heater drain, and drain pump means connected to said drain tank for pumping up the drain therein to injet the drain into said condensate feedwater system at a predetermined portion thereof; and drain level control means including conduit means connected between a portion of said drain pumping-up recovery means upstream of said drain pump means and a portion of said condensate feedwater system upstream of said condensate pumps for causing the drain in said drain tank to be returned to said portion upstream of said condensate pumps by a pressure differential therebetween so as to maintain a drain level in said drain tank at a predetermined position when the plant operates at a low load level or said drain pump means malfunctions.

2. A drain recovery system according to claim 1, wherein said drain level control means further include means for detecting a load level of the plant, and control valve means connected to said conduit means and responsive to an output signal from said load level detecting means to control the communication through said conduit means so as to maintain the drain level in said drain tank at the predetermined position.

3. A drain recovery system according to claim 2, wherein said drain level control means further includes means further includes means for detecting a trip of the drain pump means, and wherein said control valve means is also responsive to the output signal from said trip detecting means to control the communication through the conduit means so as to maintain the drain level in said drain tank at the predetermined position.

4. A drain recovery system according to claim 1, wherein said drain pumping-up recovery means further includes means for detecting a drain level in said drain tank, and a first control valve connected to the downstream side of said drain pump means, and wherein said drain level control means further includes means for detecting a load level of said plant, means for detecting a trip of said drain pump means, a second control valve connected to said conduit means, and change-over means connected to said drain level detecting means, said load level detecting means and said trip detecting means to transfer the output signal from said drain level detecting means to said first control valve to thereby allow said drain pumping-up recovery means to control the drain level in said drain tank, when no output signal is received from any one of said load level detecting means and said trip detecting means, and transfer the output signal from said drain level detecting means to said second control valve to thereby allow said conduit means to control the drain level in said drain tank therethrough, when an output signal is received from at least one of said load level detecting means and said trip detecting means.

5. A drain recovery system according to claim 1, wherein said drain level control means includes an overflow pipe connected to one end of said conduit means and disposed in said drain tank.

6. A drain recovery system according to claim 5, wherein said drain level control means further includes loop seal means connected in said conduit means for maintaining the pressure differential between said drain tank and the portion of said condensate feedwater system upstream of said condensate pumps.

7. A drain recovery system according to claim 1, wherein said portion of said condensate feedwater system upstream of said condensate pumps to which said conduit means is connected comprises said condenser.

8. A drain recovery system according to claim 1, wherein said condensate pumps include low-pressure condensate pumps and high-pressure condensate pumps, and said feedwater heaters include a low-pressure feedwater heater and a high-pressure feedwater heater positioned downstream of said high- and low-pressure condensate pumps, and wherein said drain tank is connected to said high- and low-pressure feedwater heaters so as to store the drains from both the feedwater heaters.

9. A drain recovery system according to claim 8, wherein said drain pumping-up recovery means further includes drain purifier means connected between said drain pump means 13 and said predetermined portion of said condensate feedwater system.

10. A drain recovery system according to claim 8, wherein said predetermined portion of said condensate feedwater system comprises a portion positioned on the inlet side of said high-pressure condensate pumps.

* * * * *